United States Patent [19]
Kröner

[11] Patent Number: 5,832,978
[45] Date of Patent: Nov. 10, 1998

[54] JOINT ARM FOR A JOINT ARM AWNING

[75] Inventor: Sven Kröner, Mettingen, Germany

[73] Assignee: Schmitz-Werke GmbH + Co., Emsdetten, Germany

[21] Appl. No.: 881,388

[22] Filed: Jun. 24, 1997

[30] Foreign Application Priority Data

Jul. 19, 1996 [DE] Germany ............... 296 12 532 U

[51] Int. Cl.⁶ .................................................. E04F 10/00
[52] U.S. Cl. .......................................... 160/79; 160/70
[58] Field of Search ........................... 160/79, 70, 66, 160/67, 22; 135/88.11, 88.12

[56] References Cited

U.S. PATENT DOCUMENTS

| | | | |
|---|---|---|---|
| 1,749,197 | 3/1930 | Stuart | 10/70 X |
| 1,915,529 | 6/1933 | Heiser | 160/70 |
| 2,038,045 | 4/1936 | Heiser | 160/70 |
| 4,214,621 | 7/1980 | Wessels et al. | 160/66 |
| 5,148,848 | 9/1992 | Murray et al. | 160/66 X |
| 5,174,352 | 12/1992 | Murray et al. | 160/67 |
| 5,273,095 | 12/1993 | Lukos | 160/79 X |
| 5,292,169 | 3/1994 | O'Brian | 160/70 X |

FOREIGN PATENT DOCUMENTS 26 19 175 11/1977 Germany.
26 40 796 3/1983 Germany.

*Primary Examiner*—David M. Purol
*Attorney, Agent, or Firm*—Browdy and Neimark

[57] ABSTRACT

In a joint arm for a joint-arm awning, the joint arm comprising an inner and an outer joint-arm section, which are connected with each other by way of a pivot joint, a gas spring being disposed between the inner and the outer joint arm sections, biasing the joint arm in a direction toward an extended position, an adjusting unit is provided for adjustment of the length of the gas spring in the extended condition with a view to developing a joint arm of the generic type in such a way that tolerances conditioned by manufacture and leading to mis-orientation of the drop-out pipe can easily be compensated, while the fundamental advantages of such a gas spring arrangement are maintained.

3 Claims, 3 Drawing Sheets

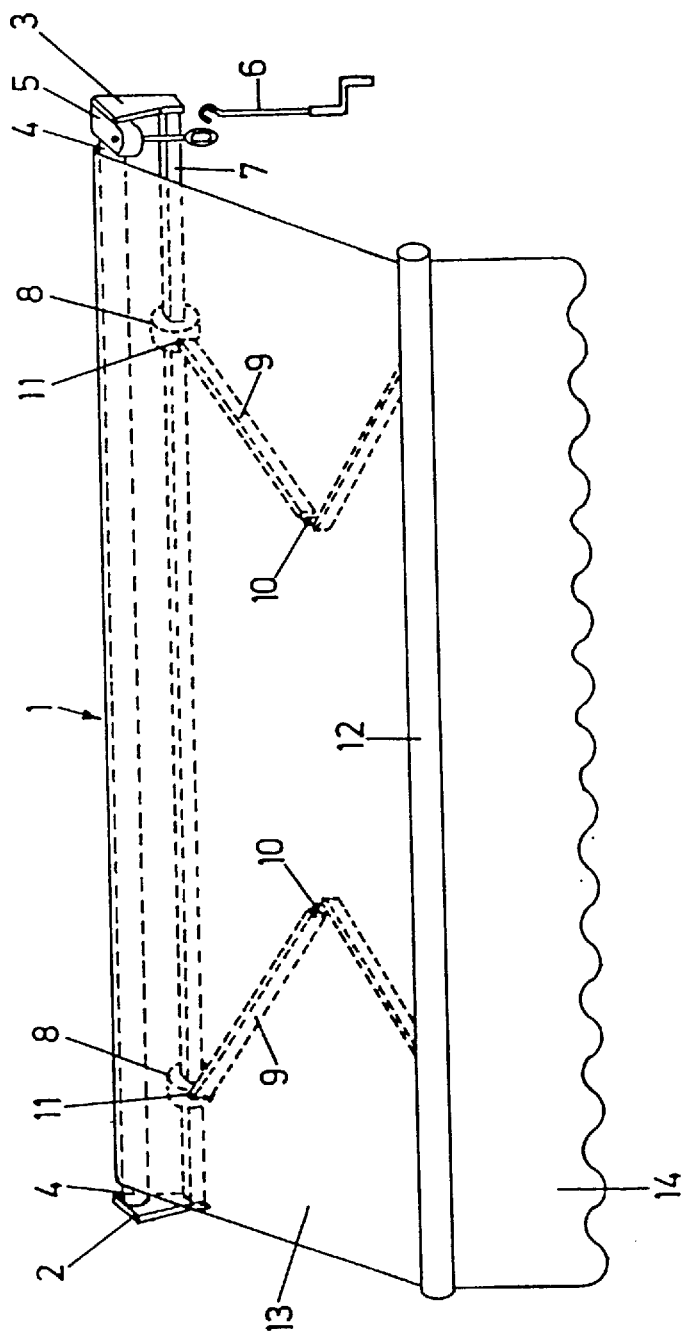

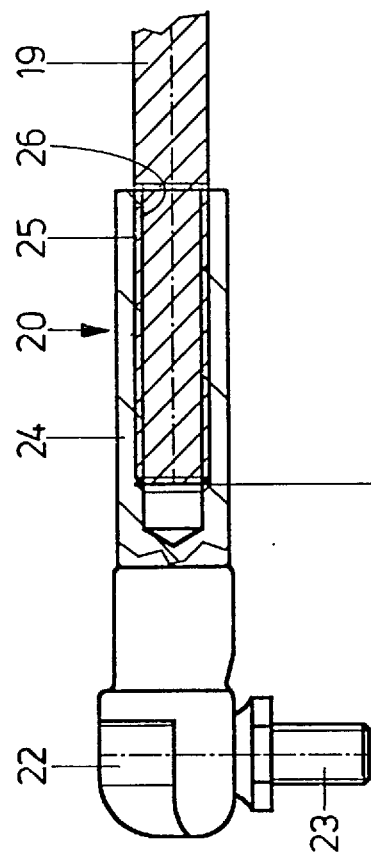
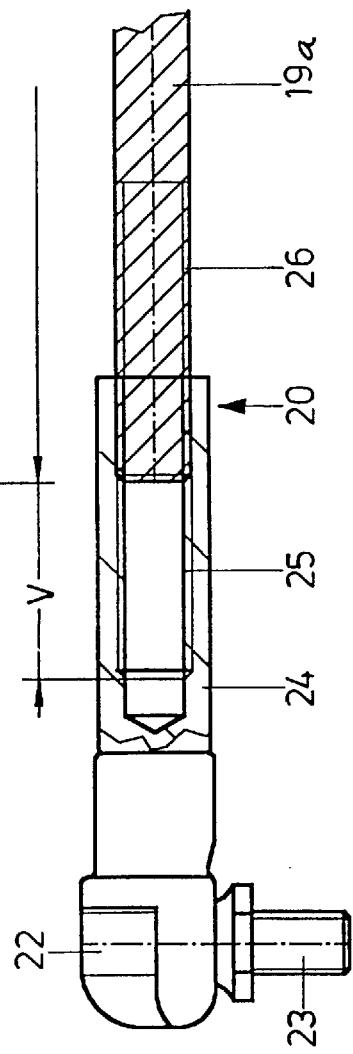

JOINT ARM FOR A JOINT ARM AWNING

BACKGROUND OF THE INVENTION

1. Field of the Invention

The invention relates to a joint arm for a joint arm awning, the joint arm comprising an inner and an outer joint-arm section which are connected with each other by a pivot joint, and a gas spring being disposed between the inner and the outer joint arm, biasing the joint arm in the direction toward its extended position.

2. Background Art

An awning comprising a joint arm of the generic type is known from DE26 19 175 A1. As regards the advantages of the use of a gas spring as opposed to conventional helical springs, DE26 19 175 A1 explains that gas spring systems, in the neutral condition, can be mounted easily and without risk and that the accurate adjustability of the spring rate complies favorably with the demands on an awning. Moreover, when a gas spring is used, the springiness in the vicinity of the joint is available even with the awning in its extended, utmost position and the gas spring, by its damping action, works against the extended awning being lifted by a gust of wind as well as against the demand on the awning when returning into its original position.

A joint arm is known from DE26 40 796 C3, in which the gas spring is disposed in a cavity of a joint-arm section and a traction element is provided for transmission of the springiness.

SUMMARY OF THE INVENTION

It is the object of the invention to develop a joint arm of the generic type in such a way that tolerances conditioned by manufacture and leading to mis-orientation of the drop-out pipe can easily be compensated, while the fundamental advantages of such a gas spring arrangement are maintained.

According to the invention, this object is attained by an adjusting unit being provided for the adjustment of the length of the gas spring in the extended condition. By reason of the changes in length, thus possible, of the gas spring, the aperture angle of the joint arm is modifiable and the drop-out pipe can be adjusted in such a way that it runs precisely parallel to the winding shaft.

Favorably, it is provided that the adjusting unit comprises a joint head for articulation to a joint section, the joint head comprising a threaded appendix with an internal or an external thread, which can be screwed on a corresponding external or internal thread of the piston rod of the gas spring for length adjustment. Consequently, length adjustment can be effected simply by screwing.

By advantage, the joint head can be articulated to the outer joint-arm section in such a way that the point of articulation has a distance from the pivot of the joint of the joint-arm sections which approximately corresponds to half the stroke. This helps obtain especially advantageous ratios of forces.

Finally, provision can be made for the gas spring to have a flat spring characteristic, which is achievable for instance by a gas spring of a comparatively great gas volume.

Details of the invention will become apparent from the ensuing description of a preferred exemplary embodiment, taken in conjunction with the drawing.

BRIEF DESCRIPTION OF THE DRAWING

FIG. 1 is a perspective view of a joint-arm awning of the generic type,

DESCRIPTION OF THE PREFERRED EMBODIMENT

Figure 2A:
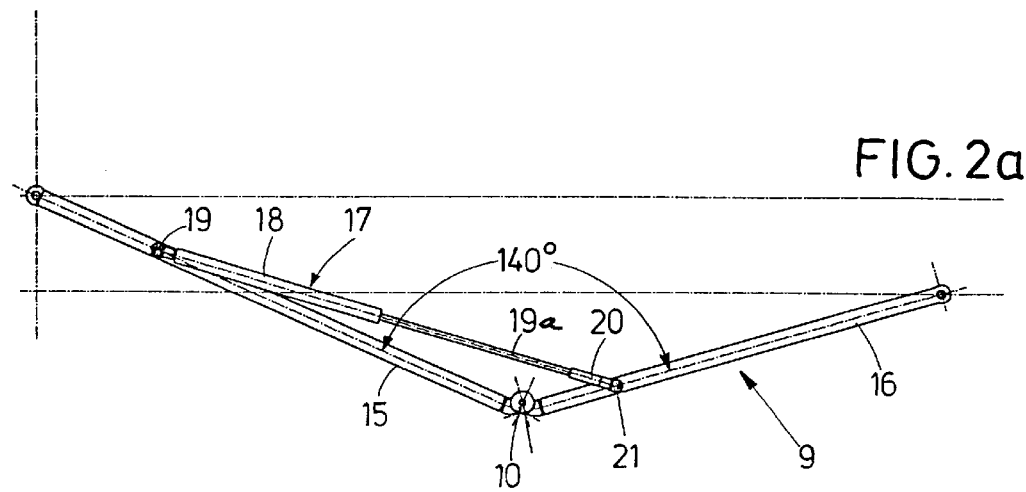
FIGS. 2a to c are illustrations of differing extended states of a joint arm according to the invention, and FIGS. 3a and b are illustrations of an adjusting unit at differing adjusted lengths.

The awning seen in the drawing comprises a support device 1 to be attached to the wall of a house or the like and provided with a winding shaft 4 rotatably run in bearing plates 2, 3. In known manner, this winding shaft 4 can be driven to rotate, i.e., according to the illustration of FIG. 1, by means of a self-locking mechanism 5 which can be driven by a demountable hang-up rod 6. Of course, as generally known, an electric-motor drive, a belt drive or the like can be used instead of the mechanism 5 and the rod 6. As part of the support device 1, a support pipe 7 of square cross-sectional shape is installed between the bearing plates 2 and 3, joint arms 9 in the form of so-called lazy tongs being mounted on the support pipe 7, each by means of a holding device for the adjustment of the angle of inclination 8. These joint arms 9 are divided centrally and provided with a pivot joint 10 having a vertical axis. Each joint arm 9 is articulated to the device 8 by a pivot joint 11 of the same kind and—this cannot be seen in the drawing—to a drop-out pipe 12 by means of a corresponding pivot joint so that the drop-out pipe 12 and the winding shaft 4 are displaceable on a common plane without being able to move vertically to this plane.

A rectangular awning cloth 13 is mounted on the winding shaft 4 which can be wound on or off the winding shaft 4 by the mentioned rotations. The awning cloth 13 is fixed to the drop-out pipe 12 in a manner generally known. A fringe 14 is fixed to the drop-out pipe 12, hanging down from it.

FIG. 2 illustrates a joint arm 9 according to the invention comprising an inner joint-arm section 15 and an outer joint-arm section 16, a gas spring 17 being disposed between the two joint-arm sections 15, 16, bridging the pivot joint 10. The cylinder 18 of the gas spring 17 is joined to the inner joint-arm section 15 by way of a pivot joint 19a and the piston 19 is joined to the outer joint-arm section 16 by way of an adjusting unit 20 and a joint 21.

Figure 2B:
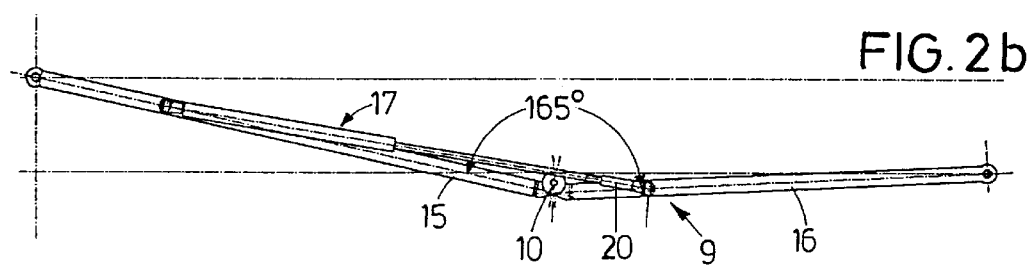
Figure 2C:
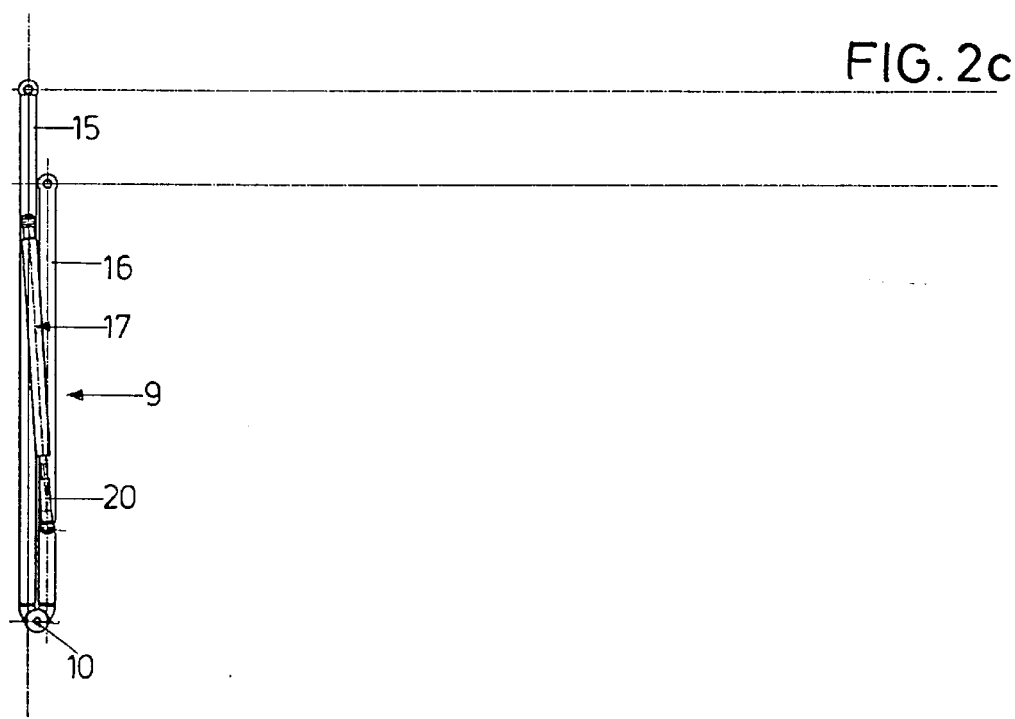

The drawing illustrates a variety of extended states, FIG. 2a showing an intermediate extended position of an angle of 140° between the joint-arm sections 15, 16, FIG. 2b a maximum extended position of an angle of 165° between the joint-arm sections 15, 16, and FIG. 2c the retracted condition of the joint arm.

So as to obtain optimal adaptability and adjustability, provision is made for the adjusting unit 20 seen in FIG. 3—in a partially sectional view.

The adjusting unit 20 comprises a joint head 22 with a joint pin 23, a threaded appendix 24 with an internal thread 25 being contiguous to the joint head 22.

An external thread 26 is formed on the outer end of the piston 19a and can be threaded into the internal thread 25. By rotation of the joint head 22 relative to the piston 19a the effective length of the gas spring 17 can be modified by an adjustment length V.

What is claimed is:

1. A joint arm for a joint-arm awning, the joint arm comprising an inner and an outer joint-arm section connected to each other by a pivot joint (10), a gas spring being disposed between the inner and the outer joint arm sections, biasing the joint arm in a direction toward an extended position, wherein adjusting means (20) for adjustment of the length of the gas spring (17) in the extended condition are located on an end of the gas spring;

wherein the adjusting unit (20) comprises a joint head (22) for articulation to the outer joint-arm section (16), the joint head (22) comprising a threaded appendix (24) with a thread (26) engaged to a corresponding thread (25) of a piston rod (19a) of the gas spring (17) for length adjustment.

2. A joint arm according to claim 1, wherein the joint head (22) is articulated on a point to the outer joint-arm section (16) so that the point of articulation has a distance from a pivot axis of the pivot joint (10) of the joint-arm sections (15, 16) approximately corresponding to half a stroke of the joint arm.

3. A joint arm according to claim 1, wherein the gas spring (17) is formed to be flat.

* * * * *